United States Patent
Grasruck et al.

(10) Patent No.: US 8,005,286 B2
(45) Date of Patent: Aug. 23, 2011

(54) METHOD FOR RECONSTRUCTING CT IMAGE DATA

(75) Inventors: Michael Grasruck, Erlangen (DE); Johan Sunnegårdh, Linköping (SE)

(73) Assignee: Siemens Aktiengesellschaft, Munich (DE)

( * ) Notice: Subject to any disclaimer, the term of this patent is extended or adjusted under 35 U.S.C. 154(b) by 190 days.

(21) Appl. No.: 12/453,865

(22) Filed: May 26, 2009

(65) Prior Publication Data

US 2009/0324044 A1 Dec. 31, 2009

Related U.S. Application Data

(60) Provisional application No. 61/076,167, filed on Jun. 27, 2008.

(30) Foreign Application Priority Data

Oct. 24, 2008 (DE) .................. 10 2008 053 108

(51) Int. Cl.
*G06K 9/00* (2006.01)
*A61B 6/00* (2006.01)
*A61B 5/05* (2006.01)
(52) U.S. Cl. .............. 382/131; 378/4; 600/425
(58) Field of Classification Search .......... 382/128, 382/129, 130, 131, 132, 133, 134; 378/4, 378/21–27, 98.6, 98.9, 101, 901; 424/9.4; 600/407, 410, 411, 425, 427; 128/916, 920, 128/922

See application file for complete search history.

(56) References Cited

U.S. PATENT DOCUMENTS

| 5,848,114 | A | * | 12/1998 | Kawai et al. ............... 378/4 |
| 6,148,057 | A | * | 11/2000 | Urchuk et al. ............. 378/18 |
| 7,409,033 | B2 | * | 8/2008 | Zhu et al. .................. 378/4 |

OTHER PUBLICATIONS

"Combining Analytical and Iterative Reconstruction in Helical Cone-Beam CT", Johan Sunnegårdh, Thesis No. 1301, Linköping; Others; Feb. 2007.
Regularized iterative weighted filtered backprojection for helical cone-beam CT Sunnegardh, J. Danielsson. P.-E. Proceedings Fully 3D Meeting and HPIR Workshop, p. 237-240; Others; 2007; DE.
A three-dimensional statistical approach to improved image quality for multislice helical CT, Thibault, J.B. et al. Med. Phys. vol. 34, issue 11,; Magazine; 2007.
German Office Action dated Jul. 21, 2009.

* cited by examiner

*Primary Examiner* — Abolfazl Tabatabai
(74) *Attorney, Agent, or Firm* — Harness, Dickey & Pierce

(57) ABSTRACT

A method is disclosed for reconstructing CT image data. In at least one embodiment, the method includes provisioning CT projection data p. Secondly, it includes reconstruction of first image data $f_{k=1}$ based on the CT projection data p. Thirdly, it includes iterative determination of k+1-th CT image data $f_{k+1}$ on the basis of the first CT image data $f_{k=1}$ as a function of: k-th CT image data $f_k$, a reconstruction of differential projection data, the differential projection data being produced as the difference between reprojected CT image data $f_k$ and the CT projection data p, as well as a local contrast-dependent smoothing of the CT image data $f_k$ using a non-quadratic correction operator $R(f_k)$. Besides suppressing "cone" artifacts, the proposed method of at least one embodiment exhibits a significant reduction in image noise after just a few iterations.

15 Claims, 1 Drawing Sheet

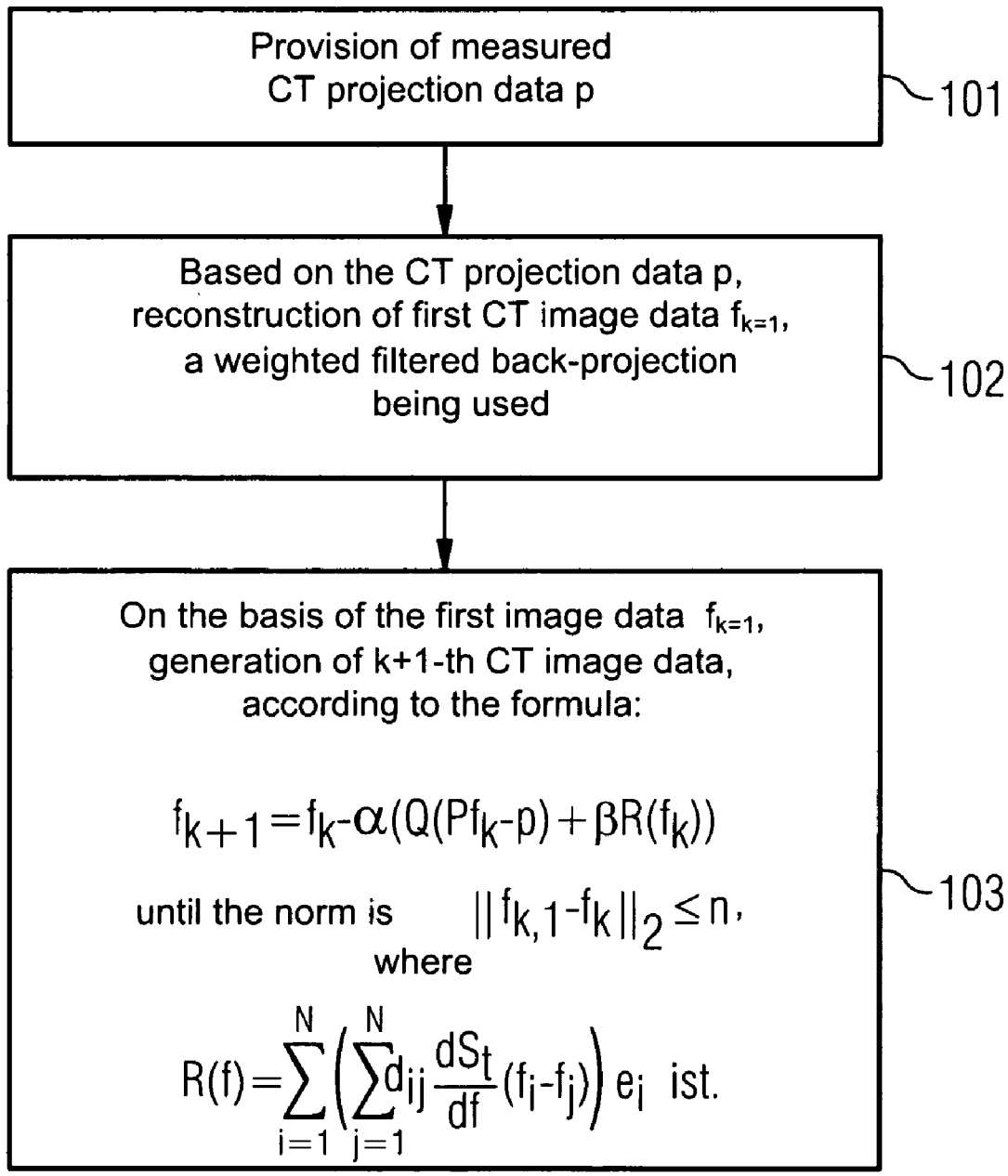

METHOD FOR RECONSTRUCTING CT IMAGE DATA

PRIORITY STATEMENT

The present application hereby claims priority under 35 U.S.C. §119 on German patent application number DE 10 2008 053 108.1 filed Oct. 24, 2008, and hereby claims priority under 35 U.S.C. §119(e) on U.S. patent application No. 61/076,167 filed Jun. 27, 2008, the entire contents of each of which is hereby incorporated herein by reference.

FIELDS

At least one embodiment of the present invention generally relates to the field of medical engineering and describes a method for reconstructing CT image data.

BACKGROUND

In the prior art weighted Filtered Back-Projection (WFBP) is currently typically used for reconstructing computed tomography image data (CT image data). The overwhelming majority of manufacturers of computed tomographs (CT) use this algorithm in various versions. These established algorithms are reliable and produce an acceptable image quality with low computing effort.

A disadvantage is that the (weighted) filtered back-projection algorithms cannot be mathematically precisely resolved for multiline systems, resulting in "cone" artifacts, especially in the case of large approach angles, because of approximations used in the algorithms. It also proves to be disadvantageous that all beams are incorporated into the reconstructed image with the same weight; in other words, although individual x-ray beams have a significantly poorer signal-to-noise ratio when scanning an object under examination because of unequal attenuation of the x-rays in the object under examination, this is not taken into account in the reconstruction. In addition, filtered back-projections are inflexible as regards the geometric simulation of the scanning process. Thus the actual spatial expansion of the x-ray focus and of the detector elements plus the gantry rotation of the CT used to obtain the CT projection data result in blurred CT projection data. The known filtered back-projection algorithms do not enable this blurring to be corrected.

Overall, filtered back-projections are now no longer adequate for certain applications as regards the spatial resolution achievable with them, the image noise and thus in the end the image quality.

Statistical reconstruction methods are known as an alternative to the weighted, filtered back-projection methods. These iterative methods are able to reduce "cone" artifacts and/or take account of information from previously reconstructed CT image data. In addition, in these methods the variable statistical quality of the individual measurement beams can be taken account of using variable weighting; in other words, they take account of the actual distribution of the noise in the CT projection data. These statistical, iterative methods enable CT image data to be created with a higher contrast, a higher spatial resolution, a smaller number of artifacts and a better signal-to-noise ratio compared to the filtered back-projection method. However, a crucial disadvantage is the considerably higher computing effort (approximately a factor of 100) for these methods compared to filtered back-projection.

SUMMARY

In at least one embodiment of the present invention, a method is specified for reconstructing CT image data which reduces at least one of the disadvantages of the prior art stipulated above, and which in particular requires less computing time compared to the known iterative, statistical methods.

The inventive method, of at least one embodiment, for reconstructing CT image data comprises the following steps:

1.1. Provision of measured CT projection data p, 1.2. Reconstruction of first image data $f_{k=1}$ based on the CT projection data p, 1.3. Iterative determination of k+1-th CT image data $f_{k+1}$ on the basis of the first CT image data $f_{k=1}$ as a function of:

k-th CT image data $f_k$, a reconstruction of differential projection data, the differential projection data being produced as the difference between reprojected CT image data $f_k$ and the CT projection data p, as well as a local contrast-dependent smoothing of the CT image data $f_k$ by a non-quadratic correction operator $R(f_k)$.

Step 1.1. entails the provision of CT projection data p, typically recorded in fan-beam geometry. For the method, the projection data is preferably converted by a rebinning step in parallel geometry. Both 2D and 3D data can be used as projection data for the method.

Step 1.2. entails a reconstruction of first CT image data $f_{k=1}$ on the basis of the CT projection data p provided. Advantageously a filtered back-projection, in particular a weighted filtered back-projection, is used in this reconstruction.

Step 1.3. entails an iterative determination of k+1-th CT image data $f_{k+1}$ from k-th CT image data $f_k$. The determination of the CT image data $f_{k+1}$ is based in each iteration step on three contributions. Firstly, on the CT image data $f_k$ resulting from the preceding k-th iteration step. Secondly, from a contribution produced by a reconstruction of differential projection data, the differential projection data being produced as the difference between reprojected CT image data $f_k$ and the initially captured CT projection data p. The second contribution thus depends, for all k>1, on the reprojected CT image data $f_k$ and the original CT projection data p.

An exact or non-exact reconstruction operator Q is preferably used for reconstructing the differential projection data. The second contribution in particular also controls the convergence of the iteration method. In an advantageous embodiment of the method the reconstruction operator Q is chosen such that it corresponds to a filtered back-projection.

A third contribution is produced by applying a nonquadratic correction operator R(f) to the CT image data $f_k$. This correction operator R(f) controls the local smoothing of the CT image data $f_{k+1}$ and thus effects a reduction in the image noise and a decrease in image artifacts.

The CT image data $f_{k+1}$ is preferably determined in step 1.3. in accordance with the formula:

$$f_{k+1} = f_k - \alpha(Q(Pf_k - p) + \beta R(f_k)) \quad (1)$$

where $f_k$=CT image data after the k-th iteration,

Q=a reconstruction operator,

P=a reprojection operator,

α,β=constants,

R(f)=a correction operator.

The values α and β are freely selectable constants which in this case control the step width of the update step (α) or the influence of the correction (β).

In an advantageous embodiment of the method, the reconstruction operator Q is selected such that $$Q = V^{-1} P^T H \qquad (2)$$

where
$V^{-1}$=a normalization matrix,
$p^T$=transposed reprojection operator P, and
H=a ramp filter.

The iteration method in step 1.3. is preferably continued until an abort criterion is met. The following relationship can in particular be used as an abort criterion:

$$\|f_{k+1} - f_k\|_2 \leq n \qquad (3)$$

In this case $\|f_{k+1} - f_k\|_2$ is a Euclidian norm of the difference between the CT image data $f_{k+1}$ and $f_k$, and n is a predefinable constant. Alternatively, a predefinable number of iterations can be used, for example, as an abort criterion. Other abort criteria are known to the person skilled in the art which can be used as required.

The correction operator R(f) (f stands for image data in general) can preferably be represented by the following formula:

$$R(f) = \sum_{i=1}^{N} \left( \sum_{j=1}^{N} d_{ij} \frac{dS_i}{df} (f_i - f_j) \right) e_i, \qquad (4)$$

where $e_i$ is an image pixel base vector, $d_{ij}$ scalars, and $S_i(f)$ a potential function. The potential function $S_i(f)$ controls the contrast dependency of the correction and should be adjusted to the requirements set for suppressing image noise and for spatial image resolution. Advantageously the scalars are selected so that the internal total (in formula (4)) is totaled over the 3×3×3 image voxels adjacent to the image voxel i.

For example, the following potential function $S_i(f)$ permits an especially good suppression of noise and a high spatial contrast resolution:

$$S(f) = \frac{|f^p|}{\left(1 + \left|\frac{f}{c}\right|^{p-q}\right)}.$$

For the choice of parameters c, p, q see the article by J-B. Thilbault et al., "A three-dimensional statistical approach to improved image quality for multislice helical CT", in Med. Phys. Vol. 34, No. 11, November 2007, pages 4526-4544, Am. Assoc. Phys. Med., the entire contents of which is hereby incorporated herein by reference; this applies in particular for the explanations contained therein on potential functions and the parameterization thereof.

Compared to filtered back-projections, the proposed method exhibits a significant reduction in image noise and image artifacts plus an increase in image resolution in the z direction after just a few iterations (7-10 iterations). Thus the inventive method is approximately 10 times faster than known statistical reconstruction methods.

Further details and advantages are explained below on the basis of an example embodiment.

BRIEF DESCRIPTION OF THE DRAWINGS

The drawing shows:
FIG. 1 a flow chart of an example embodiment of the inventive method for reconstructing CT image data.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows the flow chart of an example embodiment of the inventive method for reconstructing CT image data with the three steps 101-103. The basis of the method is that an object under examination is first, for example, scanned spirally using a CT device. Typically the scanning is performed in a cone-shaped or fan-shaped scanning geometry. The CT projection data p thereby produced is now provided in step 101 following a preceding rebinning step in parallel geometry.

Based on the CT projection data p provided, step 102 entails the reconstruction of first CT image data $f_{k=1}$, a weighted filtered back-projection being used. Such algorithms are known in the prior art, so that reference is made to them at this point. Based on the first CT image data $f_{k=1}$, step 103 entails an iterative generation of k+1-th CT image data according to the formula:

$$f_{k+1} = f_k - \alpha(Q(Pf_k - p) + \beta R(f_k))$$

until the Euclidian norm $\|f_{k+1} - f_k\|_2$ is less than or equal to a predefined value n. The correction operator $R(f_k)$ is defined by the following formula:

$$R(f_k) = \sum_{i=1}^{N} \left( \sum_{j=1}^{N} d_{ij} \frac{dS_i}{df} (f_i - f_j) \right) e_i$$

where the potential function $S_i(f)$ corresponds to the function $$S(f) = \frac{|f^p|}{\left(1 + \left|\frac{f}{c}\right|^{p-q}\right)}.$$

The reconstruction operator Q is selected so that $Q = V^{-1} P^T H$.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combineable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for reconstructing CT image data comprising:
provisioning CT projection data p;
reconstructing first image data $f_{k=1}$ based on the CT projection data p; and
iteratively determining k+1-th CT image data $f_{k+1}$ on the basis of the first CT image data $f_{k=1}$ as a function of:
k-th CT image data $f_k$,
a reconstruction of differential projection data, the differential projection data being produced as the difference between reprojected CT image data $f_k$ and the CT projection data p, and
a local contrast-dependent smoothing of the CT image data $f_k$ by a non-quadratic correction operator $R(f_k)$.

2. The method as claimed in claim 1, wherein the CT image data $f_{k+1}$ is determined in accordance with the formula:

$$f_{k+1} = f_k - \alpha(Q(Pf_k - p) + \beta R(f_k))$$

where
$f_k$=CT image data after the k-th iteration,
Q=a reconstruction operator,
P=a reprojection operator,
$\alpha, \beta$=constants,
$R(f_k)$=the non-quadratic correction operator.

3. The method as claimed in claim 2, wherein the reconstruction operator Q corresponds to a filtered back-projection.

4. The method as claimed in claim 3, wherein the potential function S(f) is reproduced by the formula $$S(f) = \frac{|f^p|}{\left(1 + \left|\frac{f}{c}\right|^{p-q}\right)}.$$

5. The method as claimed in claim 2, wherein the reconstruction operator is $Q = V^{-1} P^T H$, $V^{-1}$ being a normalization matrix, $P^T$ a transposed reprojection operator P, and H a ramp filter.

6. The method as claimed in claim 5, wherein the potential function S(f) is reproduced by the formula $$S(f) = \frac{|f^p|}{\left(1 + \left|\frac{f}{c}\right|^{p-q}\right)}.$$

7. The method as claimed in claim 2, wherein the iteration is performed until an abort criterion is met.

8. The method as claimed in claim 7, wherein the following relationship is used as an abort criterion $$\|f_{k+1} - f_k\|_2 \leq n,$$

n being a predefinable constant.

9. The method as claimed in claim 2, wherein the non-quadratic correction operator R(f) is determined by the following formula:

$$R(f) = \sum_{i=1}^{N} \left( \sum_{j=1}^{N} d_{ij} \frac{dS_i}{df} (f_i - f_j) \right) e_i,$$

where
$e_i$=image pixel base vector
$d_{ij}$=scalars
$S_i(f)$=a potential function.

10. A computer readable medium including program segments for, when executed on a computer device, causing the computer device to implement the method of claim 2.

11. The method as claimed in claim 1, wherein the iteration is performed until an abort criterion is met.

12. The method as claimed in claim 11, wherein the following relationship is used as an abort criterion $$\|f_{k+1} - f_k\|_2 \leq n,$$

n being a predefinable constant.

13. The method as claimed in claim 1, wherein the non-quadratic correction operator R(f) is determined by the following formula:

$$R(f) = \sum_{i=1}^{N} \left( \sum_{j=1}^{N} d_{ij} \frac{dS_i}{df} (f_i - f_j) \right) e_i, \text{ where}$$

$e_i$=image pixel base vector
$d_{ij}$=scalars
$S_i(f)$=a potential function.

14. The method as claimed in claim 13, wherein the potential function S(f) is reproduced by the formula $$S(f) = \frac{|f^p|}{\left(1 + \left|\frac{f}{c}\right|^{p-q}\right)}.$$

15. A computer readable medium including program segments for, when executed on a computer device, causing the computer device to implement the method of claim 1.

* * * * *